(12) United States Patent
Tsai et al.

(10) Patent No.: US 8,531,631 B2
(45) Date of Patent: Sep. 10, 2013

(54) COLOR DISPLAY APPARATUS

(75) Inventors: Wei-Chen Tsai, Hsinchu (TW); Chih-Yu Peng, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 31 days.

(21) Appl. No.: 13/283,968

(22) Filed: Oct. 28, 2011

(65) Prior Publication Data

US 2012/0229740 A1   Sep. 13, 2012

(30) Foreign Application Priority Data

Mar. 11, 2011  (TW) .............................. 100108377 A

(51) Int. Cl.
*G02F 1/1335*  (2006.01)
(52) U.S. Cl.
USPC .......................................... 349/106; 349/122
(58) Field of Classification Search
None
See application file for complete search history.

(56) References Cited

FOREIGN PATENT DOCUMENTS

JP   2003-215321   *   7/2003

* cited by examiner

*Primary Examiner* — Richard Kim
(74) *Attorney, Agent, or Firm* — WPAT, PC; Justin King

(57) ABSTRACT

A color display apparatus includes a driving substrate, a color filter and a display layer. The driving substrate has a display region and a non-display region, and at least a first alignment mark is disposed on the non-display region. The color filter is opposite to the driving substrate. The color filter includes a substrate and a filter layer disposed on the substrate. The substrate has a first region corresponding to the display region and a second region corresponding to the non-display region. The filter layer includes color filter patterns located on the first region and at least a second alignment mark located on the second region and corresponding to the first alignment mark. The display layer is disposed between the driving substrate and the color filter. Alignment precision between the driving substrate and the color filter of the color display apparatus is improved. Besides, a color filter is also provided.

6 Claims, 3 Drawing Sheets

COLOR DISPLAY APPARATUS

FIELD OF THE INVENTION

The present invention relates to a display apparatus, and more particularly to a color display apparatus and a color filter thereof.

BACKGROUND OF THE INVENTION

With progress and development of display technology, various kinds of display apparatuses are sequentially introduced and widely used in daily life. In order to realize color display, some of the display apparatuses utilize the color filter, so as to display color images.

FIG. 1 is a schematic view of a typical color display apparatus, and FIG. 2 is a schematic, top view of a color filter of the color display apparatus shown in FIG. 1. Referring to FIGS. 1 and 2, the typical color display apparatus 100 includes a driving substrate 110, a color filter 120 and a display layer 130. The color filter 120 is opposite to the driving substrate 110, and the display layer 130 is disposed between the driving substrate 110 and the color filter 120. The driving substrate 110 has an alignment mark 111. The color filter 120 includes a substrate 121, a plurality of color filter patterns 122 and a black resin layer 124, and the color filter patterns 122 and the black resin layer 124 are disposed on the substrate 121. The black resin layer 124 includes a black matrix 125 and an alignment mark 127, and the black matrix 125 is configured for separating the color filter patterns 122.

In the typical technology, the color filter 120 is formed by firstly forming the black resin layer 124 on the substrate 121, and then forming the color filter patterns 122 by utilizing the alignment mark 127 of the black matrix 125 as the alignment mark for a photo mask. Furthermore, during assembly of the color filter 120 and the driving substrate 110, the alignment mark 111 of the driving substrate 110 is aligned to the alignment mark 127 of the black resin layer 124, so as to align the color filter patterns 122 to the driving substrate 110.

However, during fabrication of the color filter patterns 122, relative position error may be generated between the color filter patterns 122 and the alignment mark 127 because of fabrication process factors. However, during assembly of the color filter 120 and the driving substrate 110, the alignment mark 127 is used as the alignment benchmark. Therefore, even though the alignment mark 111 is precisely aligned with the alignment mark 127, the color filter patterns 122 are easily misaligned with pixels of the driving substrate 110, thereby decreasing display quality of the color display apparatus 100.

SUMMARY OF THE INVENTION

The present invention provides a color display apparatus with improved display quality.

The present invention further provides a color filter for improving display quality of a color display apparatus.

In order to achieve at least of the above-mentioned advantages, one embodiment of the present invention provides a color display apparatus includes a driving substrate, a color filter and a display layer. The driving substrate has a display region and a non-display region, and at least a first alignment mark is disposed on the non-display region. The color filter is opposite to the driving substrate. The color filter includes a substrate and a filter layer. The substrate has a first region corresponding to the display region and a second region corresponding to the non-display region. The filter layer is disposed on the substrate, and the filter layer includes a plurality of color filter patterns located on the first region and at least a second alignment mark located on the second region and corresponding to the first alignment mark. The display layer is disposed between the driving substrate and the color filter.

In one embodiment of the present invention, the color filter patterns include at least a red filter pattern, at least a green filter pattern and at least a blue filter pattern, and the at least a second alignment mark includes at least one of a red alignment mark, a green alignment mark and a blue alignment mark.

In one embodiment of the present invention, the color filter further includes a light shielding layer disposed on the substrate to form a plurality of pixel areas on the substrate, and the color filter patterns are disposed in the pixel areas respectively.

In one embodiment of the present invention, the driving substrate is an active driving substrate.

In one embodiment of the present invention, the driving substrate is a passive driving substrate.

In one embodiment of the present invention, the display layer is an electrical paper display layer or a liquid crystal display layer.

In order to achieve at least of the above-mentioned advantages, one embodiment of the present invention further provides a color filter including a substrate and a filter layer. The substrate has a first region and a second region. The filter layer is disposed on the substrate, and the filter layer includes a plurality of color filter patterns located on the first region and at least an alignment mark located on the second region.

In the color display apparatus and the color filter of embodiments of the present invention, because the filter layer includes the color filter patterns and the alignment mark, the alignment mark of the filter layer may be used as an alignment benchmark directly during the assembly of the color filter and the driving substrate. Therefore, alignment precision between the color filter patterns and the pixels of the driving substrate is improved, thereby improving display quality of the color display apparatus.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
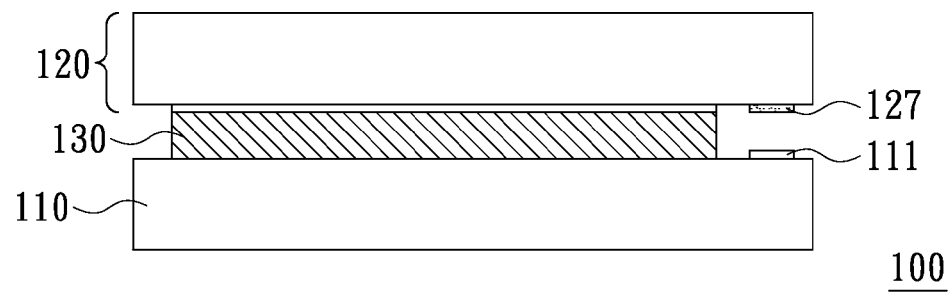
FIG. 1 is a schematic view of a typical color display apparatus.
Figure 2:
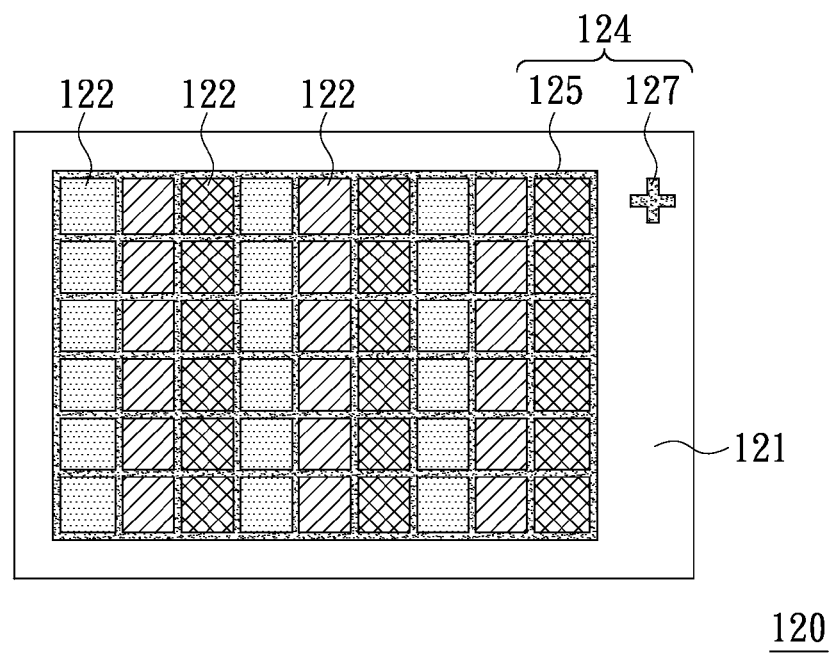
FIG. 2 is a schematic, top view of a color filter of the color display apparatus shown in FIG. 1.
Figure 3:
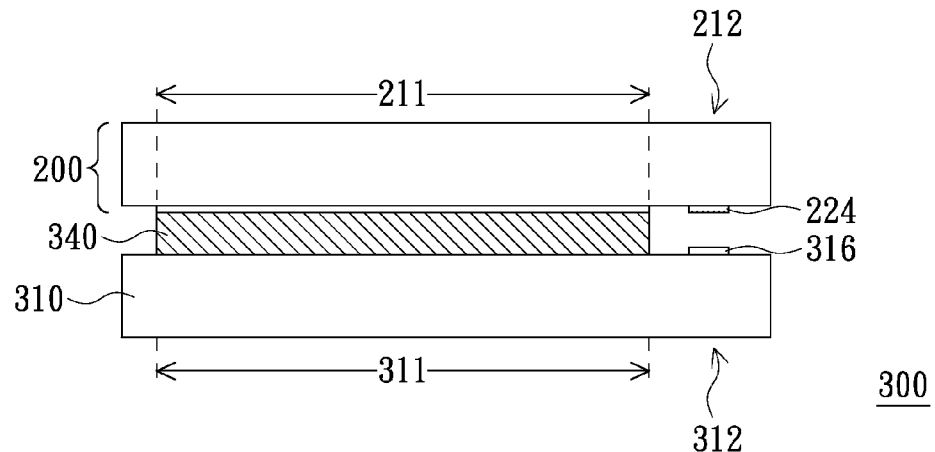
FIG. 3 is a schematic view of a color display apparatus according to an embodiment of the present invention.
Figure 4:
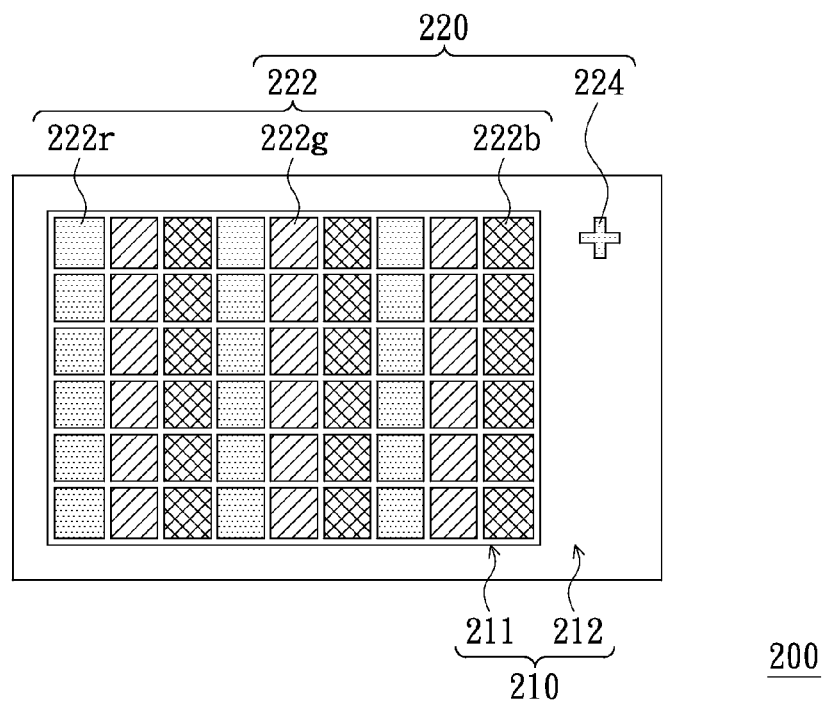
FIG. 4 is a schematic, top view of a color filter of the color display apparatus shown in FIG. 3.

FIG. 3 is a schematic view of a color display apparatus according to an embodiment of the present invention, and FIG. 4 is a schematic, top view of a color filter of the color display apparatus shown in FIG. 3. Referring to FIGS. 3 and 4, a color display apparatus 300 of the present embodiment includes a driving substrate 310, a color filter 200 opposite to the driving substrate 310, and a display layer 340 disposed between the driving substrate 310 and the color filter 200. The driving substrate 310 has a display region 311 and a non-display region 312, and at least an alignment mark 316 is disposed on the non-display region 312. The display region 311 has a driving element array (not shown) for driving the display layer 340. The non-display region 312 is located besides the display region 311 and has periphery circuits. The driving substrate 310 may be, but not limited to, an active driving substrate or a passive driving substrate. The display layer 340 may be, but not limited to, an electrical paper display layer or a liquid crystal display layer. The electrical paper display layer may be an electrophoretic layer, a quick response liquid powder layer, a cholesteric liquid crystal layer, or an electrowetting layer. The present invention does not limit the type of the electrical paper display layer, and a proper electrical paper display layer will be selected according to design requirement.

The color filter 200 includes a substrate 210 and a filter layer 220. The substrate 210 has a first region 211 corresponding to the display region 311 and a second region 212 corresponding to the non-display region 312. The filter layer 220 is disposed on the substrate 210, and the filter layer 220 includes a plurality of color filter patterns 222 located on the first region 211 and at least an alignment mark 224 located on the second region 212. The number and position of the alignment mark 224 correspond to the number and position of the alignment mark 316 such that the alignment mark 224 and the alignment mark 316 can be used as alignment benchmarks during assembly of the color filter 200 and the driving substrate 310. Furthermore, material of the filter layer 220 may be, but not limited to, photoresist. Material of the alignment mark 224 is the same as that of the color filter patterns 222. That is, the alignment mark 224 and the color filter patterns 222 can be formed at the same time.

The color filter patterns 222 may include at least a red filter pattern 222r, at least a green filter pattern 222g and at least a blue filter pattern 222b. In this embodiment, a plurality of the red filter patterns 222r, a plurality of the green filter patterns 222g and a plurality of the blue filter patterns 222b are taken as an example. Furthermore, the at least an alignment mark 224 may be at least one of a red alignment mark, a green alignment mark and a blue alignment mark. That is, a number of the alignment mark 224 may be one or more, and each alignment mark 224 may be a red alignment mark, a green alignment mark or a blue alignment mark. The alignment marks 224 of the color filter 200 may have the same color or different colors. In this embodiment, one alignment mark 224 is taken as an example, and the alignment mark 224 is, for example, the red alignment mark. Therefore, the alignment mark 224 and the red filter pattern 222r are formed at the same process. In other embodiments, the alignment mark 224 may be the green alignment mark or the blue alignment mark.

In the embodiment of the present invention, because the filter layer 220 of the color filter 200 includes the alignment mark 224, the alignment mark 224 of the filter layer 220 may be used as an alignment benchmark during the assembly of the color filter 200 and the driving substrate 310, and it is no need to utilize the alignment mark of the black resin layer of the typical art as the alignment benchmark. Therefore, alignment precision between the color filter patterns 222 and pixels (not shown) of the driving substrate 310 is improved, and display quality of the color display apparatus 300 is further improved.

Figure 5:
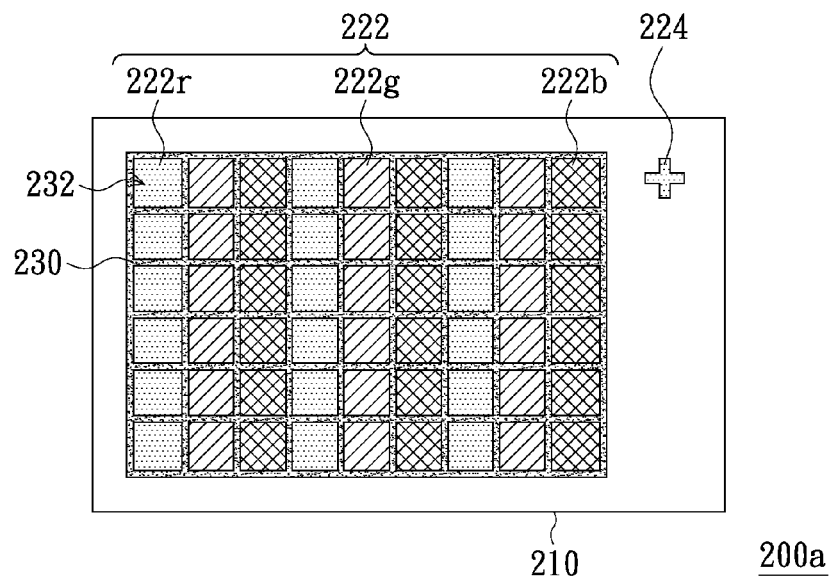
FIG. 5 is a schematic, top view of a color filter according to another embodiment of the present invention.

It should be noted that, the color filter 200 of this embodiment does not include a light shielding layer, but in another embodiment as shown in FIG. 5, the color filter 200a may further include a light shielding layer 230. The light shielding layer 230 is disposed on the substrate 210 to form a plurality of pixel areas 232 on the substrate 210. The color filter patterns 222 are disposed in the pixel areas 232 respectively. Furthermore, the arrangement manner of the color filter patterns 222 with different colors is taken as an example, and the present invention does not limit the arrangement manner of the color filter patterns 222.

The design concept of the present invention is to dispose the alignment mark of the color filter on the filter layer for improving the alignment precision between the color filter patterns and the pixels of the driving substrate, and the shape and number of the alignment mark of the color filter are not limited. Another embodiment of the color filter of the present invention will be described below, but it does not limit the present invention. Furthermore, the position and number of the alignment mark of the driving substrate may be modified according to the position and number of the alignment mark of the color filter, and the alignment mark of the driving substrate will not be described hereinafter.

Figure 6:
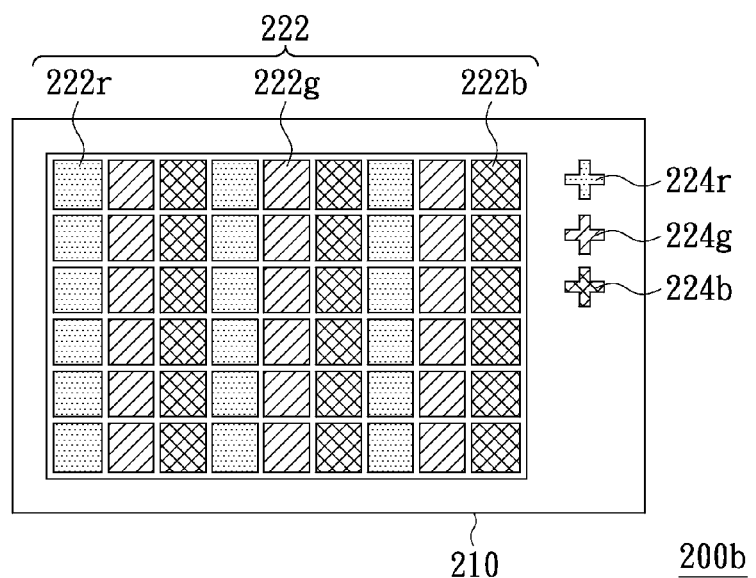
FIG. 6 is a schematic, top view of a color filter according to a further embodiment of the present invention.

FIG. 6 is a schematic, top view of a color filter according to a further embodiment of the present invention. Referring to FIG. 6, the difference between the color filter 200b of this embodiment from the color filter 200 is, the color filter 200b includes a plurality of alignment marks, and the colors of the alignment marks correspond to the colors of the color filter patterns 222. For example, the alignment marks include a red alignment mark 224r corresponding to the red filter patterns 222r, a green alignment mark 224g corresponding to the green filter patterns 222g and a blue alignment mark 224b corresponding to the blue filter patterns 222b. The red alignment mark 224r and the red filter patterns 222r may be formed at the same process. The green alignment mark 224g and the green filter patterns 222g may be formed at the same process. The blue alignment mark 224b and the blue filter patterns 222b may be formed at the same process.

Because the color filter 200b of the present embodiment includes the red alignment mark 224r, the green alignment mark 224g and the blue alignment mark 224b, the red alignment mark 224r, the green alignment mark 224g and the blue alignment mark 224b may be used as alignment benchmarks during the assembly of the color filter 200b and the driving substrate. Therefore, alignment precision between the color filter patterns (i.e. the green filter patterns 222g, the red filter patterns 222r, and the blue filter patterns 222b) and the pixels of the driving substrate is improved, and the display quality of the color display apparatus is further improved.

It should be noted that the color filter 200b of this embodiment may further include a light shielding layer (not shown) for separating the color filter patterns 222. In this embodiment, three alignment marks corresponding to color filter patterns with three different colors are taken as an example, but in other embodiments, two alignment marks corresponding to color filter patterns with different colors may be taken as example according to design requirements. Furthermore, if the color filter patterns have more than three colors, the number and colors of the alignment marks may be modified.

As mentioned above, in the color display apparatus and the color filter of the embodiments of the present invention, because the filter layer includes the color filter patterns and the alignment mark, the alignment mark of the filter layer may be used as an alignment benchmark directly during the assembly of the color filter and the driving substrate. As compared to the typical art of utilizing the alignment mark of the black resin layer as the alignment benchmark, the present invention using the alignment mark of the filter layer as the alignment benchmark improves the alignment precision between the color filter patterns and the pixels of the driving substrate, and further improves the display quality of the color display apparatus.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A color display apparatus, comprising:
   a driving substrate having a display region and a non-display region, and at least a first alignment mark being disposed on the non-display region;
   a color filter opposite to the driving substrate, the color filter comprising:
      a substrate having a first region corresponding to the display region and a second region corresponding to the non-display region; and
      a filter layer disposed on the substrate, the filter layer comprising a plurality of color filter patterns located on the first region and at least a second alignment mark located on the second region and corresponding to the at least a first alignment mark; and
   a display layer disposed between the driving substrate and the color filter.

2. The color display apparatus according to claim 1, wherein the color filter patterns include at least a red filter pattern, at least a green filter pattern and at least a blue filter pattern, and the at least a second alignment mark includes at least one of a red alignment mark, a green alignment mark and a blue alignment mark.

3. The color display apparatus according to claim 1, wherein the color filter further includes a light shielding layer disposed on the substrate to form a plurality of pixel areas on the substrate, and the color filter patterns are disposed in the pixel areas respectively.

4. The color display apparatus according to claim 1, wherein the driving substrate is an active driving substrate.

5. The color display apparatus according to claim 1, wherein the driving substrate is a passive driving substrate.

6. The color display apparatus according to claim 1, wherein the display layer is an electrical paper display layer or a liquid crystal display layer.

* * * * *